Feb. 25, 1936.  E. F. ROSSMAN  2,032,183

SHOCK ABSORBER

Filed June 18, 1932  2 Sheets-Sheet 1

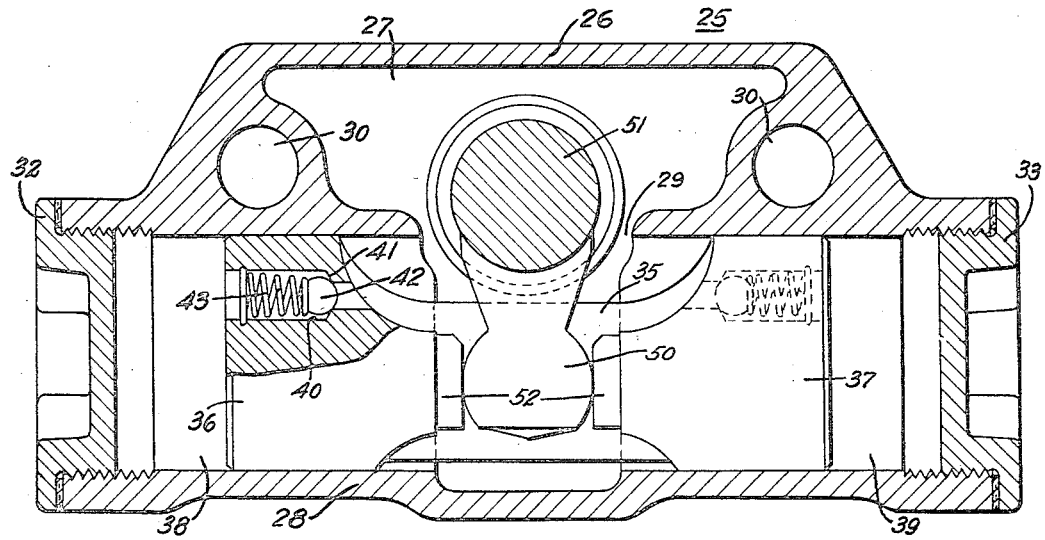
Fig. 3.
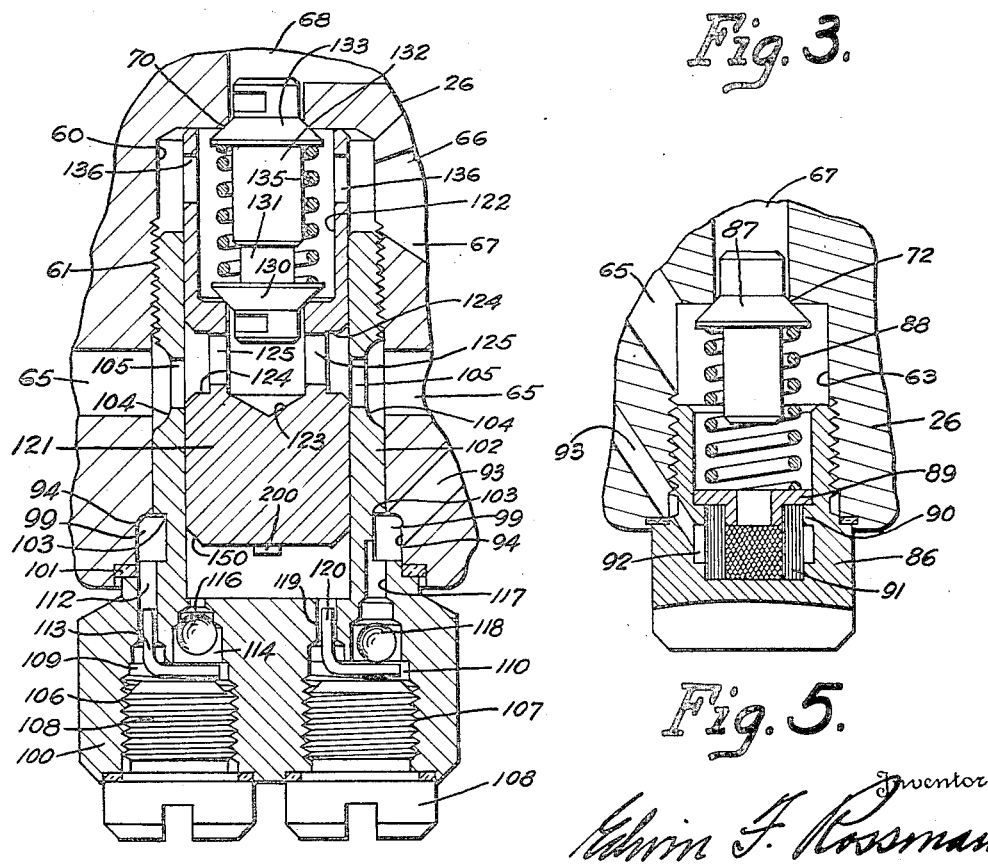
Fig. 4.
Fig. 5.

Patented Feb. 25, 1936

2,032,183

UNITED STATES PATENT OFFICE 2,032,183

SHOCK ABSORBER

Edwin F. Rossman, Dayton, Ohio, assignor, by mesne assignments, to General Motors Corporation, Detroit, Mich., a corporation of Delaware Application June 18, 1932, Serial No. 617,948

21 Claims. (Cl. 188—88)

This invention relates to improvements in hydraulic shock absorbers, particularly of the double-acting type.

Shock absorbers for motor driven vehicles have been produced in both single and double-acting types, the former resisting only the compression movements of the vehicle springs, the latter resisting both the compression and the rebounding movements of the vehicle springs.

In some of the double-acting types, the shock absorbers resisted both the compression and the rebounding movements of the vehicle springs with equal force, while in others the shock absorbers offered a greater resistance to the rebounding movements of the vehicle springs than to the compression movements thereof.

The present invention has for one of its objects to provide a double-acting hydraulic shock absorber with an automatic control device whereby said shock absorber will more greatly resist the rebounding movement of the vehicle springs than the compression movement thereof.

A further object of the present invention is to provide the double-acting hydraulic shock absorber with hydraulically operated adjusting mechanism so that the shock absorber will adjust itself to provide a greater resistance to the rebounding movements of the vehicle springs than to the compression movements thereof.

A still further object of the present invention is to utilize the fluid flow in one direction within the shock absorber, which flow results from the compression movement of the vehicle springs, for purposes of adjusting the fluid flow control device of the shock absorber to increase the restriction to the fluid flow responsive to both the compression and rebounding movements of the vehicle springs.

Further objects and advantages of the present invention will be apparent from the following description, reference being had to the accompanying drawings, wherein a preferred embodiment of one form of the present invention is clearly shown.

In the drawings:

Fig. 3 is a longitudinal sectional view taken through the shock absorber illustrating the reciprocative piston within the shock absorber cylinder.

Fig. 4 is a fragmentary, enlarged sectional view showing the automatic control device of the shock absorber.

Fig. 5 is a fragmentary enlarged sectional view illustrating one of the check valves of the shock absorber.

Figure 1:
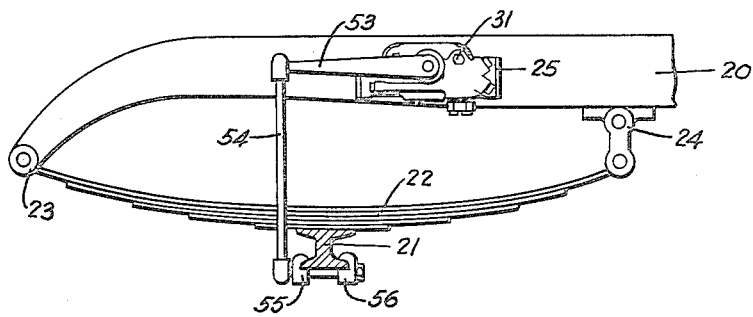
Fig. 1 is a fragmentary side view of the vehicle chassis, the road wheels having been omitted for the sake of clearness, a shock absorber equipped with the present invention being shown secured to the frame of the vehicle.

The shock absorber illustrated in the drawings is adapted to control both the approaching and separating movements of the two relatively movable members, namely the frame and axle of the motor vehicle. In the present drawings the frame of the vehicle is designated by the numeral 20, said frame being resiliently supported upon the vehicle axle 21 by vehicle springs, one of which is shown at 22. One end of the spring is hingedly secured to the frame as at 23, the other as at 24.

The shock absorber designated as a whole by the numeral 25, comprises a casing 26 (see Figs. 2 and 3) said casing providing a fluid reservoir 27 and a cylinder 28 in communication with said reservoir through the opening 29 within the casing. Holes 30 are provided in the casing for receiving studs 31 by means of which the shock absorber 25 is attached to the frame 20 of the vehicle. Both open ends of the cylinder 28 are shown in the present drawings provided with cylinder head caps 32 and 33 respectively, said caps being threaded into their respective cylinder ends and having gaskets to prevent fluid leaks.

Within the cylinder 28 there is provided a reciprocative piston 35 having two piston head portions 36 and 37. The piston head portion 36 forms the spring compression control chamber 38 at one end of the cylinder, while piston head portion 37 forms the spring rebound control chamber 39 at the opposite end of the cylinder.

Each piston head portion is provided with a fluid replenishing valve, and inasmuch as these valves are identical only one will be described detailedly.

The head portion has a through passage 40 providing communication between the reservoir and the respective compression chamber. A reduced portion in the passage 40 forms a valve seat 41 upon which the ball check valve 42 is urged by a spring 43. It may be seen that the ball check valve will prevent fluid from flowing from the respective compression chamber to the reservoir as the piston moves to exert pressure upon the fluid within its compression chamber, however, the valve will act to establish a flow from the reservoir 27 through the passage 40 into the respective compression chamber as the piston is moved to increase the area of its respective compression chamber.

A space is provided between the piston head portions 36 and 37 for receiving the rocker arm 50, which rocker arm is secured to the rocker shaft 51 transversely supported in the casing 26. Each piston head portion also carries a wearpiece 52, of suitable hardened material, the rocker arm 50 engaging said wearpieces as shown in the Fig. 3.

One end of the rocker shaft 51 extends outside the casing 26 and has the shock absorber operating arm 53 provided thereon. The free end of said arm is swivelly attached to one end of a link 54, the opposite end of said link being swivelly secured to a bracket 55 which is clamped upon the axle 21 by the clamping member 56.

From this it may be seen that the rocker arm 50 is operatively connected with the axle 21 and will be oscillated in response to and in accordance with the movement of said axle. More specifically, when the axle 21 is moved toward the frame 20 during the compression of the spring 22, link 54 and arm 53 will cause a clockwise rotation of the shaft 51 and rocker arm 50 and consequently a moving of the piston 35 toward the left as regards Figs. 1, 2 and 3. This results in pressure being exerted by the piston head 36 upon the fluid within the spring compression control chamber 38, on the other hand, as the axle 21 moves on its separating movement from the frame 20 or during the rebounding movement of the vehicle springs 22, movement of the shaft 51 and rocker arm 50 will be reversed and consequently piston 35 will be moved toward the right as regards Figs. 1, 2 and 3. This movement of the piston causes the head portion 37 to exert pressure upon the fluid within the spring rebound control chamber 39.

Means are provided in the shock absorber casing 26 for the transfer of fluid from one compression chamber into the other in response to the reciprocations of the piston 35. This means will now be described detailedly.

Figure 2:
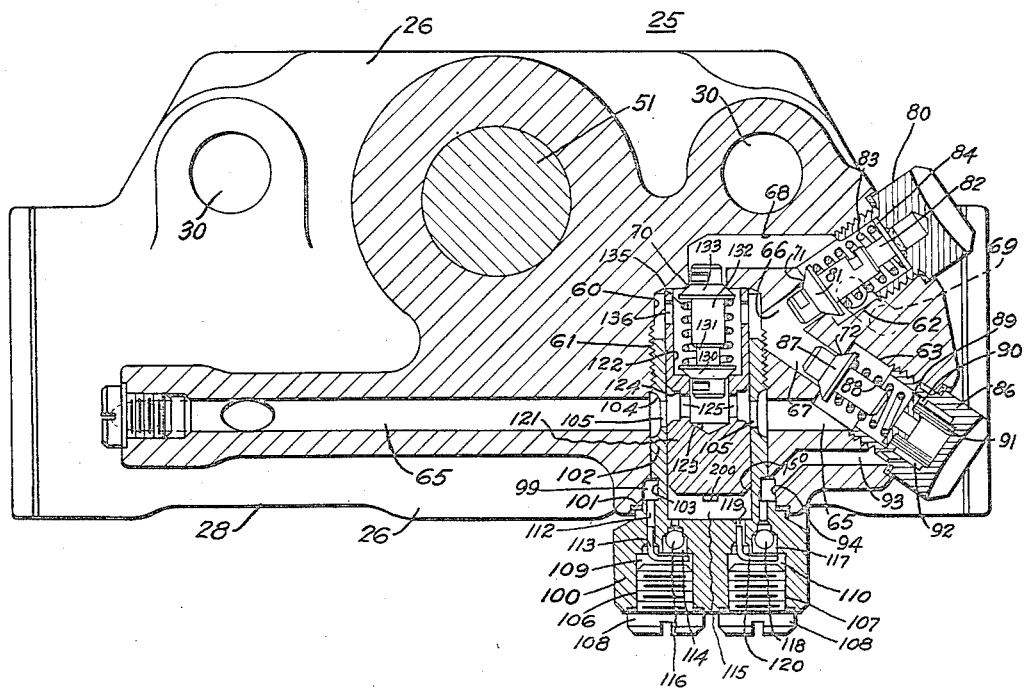
Fig. 2 is a longitudinal sectional view of the shock absorber showing the fluid flow control devices thereof.

Within the casing 26 there is provided a recess 60 forming a valve-chamber. One end of this valve-chamber opens to the outside of the shock absorber, as shown in Figs. 2 and 4. Adjacent the inner end of this recess 60 are provided interior threads as at 61. Two other recesses are provided in the casing, one designated by the numeral 62, the other by the numeral 63. Both these recesses have interior threads for purposes to be described.

A duct 65 leads from the spring compression control chamber 38 into the recess 60. An extension of this duct 65 leads from the opposite side of recess 60 into the recess or chamber 63 as shown in Fig. 2. A passage 66 leading from the chamber 62 communicates with a passage 67 which leads from the chamber 63, both said passages 66 and 67 communicating with the recess 60. Another duct 68 leads from the recess or chamber 62 into the inner end of the recess 60. Still another duct 69 shown in dotted lines, provides communication between the recess or chamber 62 and the spring rebound control chamber 39.

Various valve seats are provided at points of communication between the various passages or ducts with their respective chambers. One of these valve seats, designated by the numeral 70, is formed where the passage or duct 68 opens into the inner end of the recess 60. Another valve seat 71 is provided at the point of communication between passage 66 and the chamber 62, while a similar seat 72 is formed at the point of communication between passage 67 and the channel 63.

The check valve mechanism housed within the recess or chamber 62 will now be described. A recessed screw plug 80 is received within the threaded end of the recess 62. Cooperating with valve-seat 71 is a valve 81 having a tubular body portion slidably supported on the valve stem 82, the valve 81 being urged upon its seat by the spring 83 which is interposed between the valve 81 and a washer 84 secured to the valve stem 82 and seated in the bottom of the recess of the screw plug 80 as shown in Fig. 2.

The check-valve contained within the chamber 63 comprises the following: a screw cap or plug 86 recessed and similar in construction to the plug 80 is received by the threaded end of the recess 63. The valve 87 is urged upon the seat 72 by a spring 88 interposed between the valve 87 and a collar 89 which rests upon an annular flange 90 within the screw plug 86. Beneath the collar 89 and fitting into the annular space formed by the annular flange 90, is a circular screen member 91. The space within the screw plug 86 and outside the screen 91, which space is designated by the numeral 92, is in communication with a fluid passage 93 in the casing, said fluid passage discharging into an annular groove 94 formed in the inner wall of the recessed portion 60 of the casing adjacent its outer end, as is clearly shown in the Figs. 2 and 4.

The recess 60 receives a plug 100 having a head portion which presses a sealing gasket 101 between it and the casing 26 to prevent fluid leaks at this point. This screw plug has a tubular portion 102 extending into the recess 60, fitting said recess substantially snugly, the inner end of said tubular portion having threads operatively engaging the threaded portion 61 of the recess. Two annular grooves are provided in the outside surface of this tubular portion of the plug 100, one being designated by the numeral 103, aligning with the annular groove 94 in the casing to provide an annular chamber 99 which, as has been mentioned heretofore, receives fluid from the fluid passage 93 in communication with the interior of the recessed screw plug 86. The other annular groove designated by the numeral 104, is in alignment with the duct 65 and provides an annular chamber within the recess 60 which is in communication with said duct 65. Side openings 105 in the tubular portion 102 of the screw plug 100 provide communication between the annular space formed by groove 104 and the interior of the tubular portion 102.

Two recesses 106 and 107 are provided in the end of the screw plug 100. Both of these recesses are interiorly threaded to receive sealing screws 108. These sealing screws have body portions of such a length that interior chambers 109 and 110 are formed within the recesses 106 and 107 respectively. A passage 112 in the screw plug 100 provides communication between the chamber 109 and the annular chamber 99. One end of an angularly bent piece of wire 113 extends into this passage 112, the diameter of this wire being predetermined so that a predetermined space is provided between the wire and the inner wall of said passage 112 thereby to provide an orifice of predetermined size to control the fluid flow through said passage 112. Another passage 114 leads from the inner chamber 109 to the chamber 115 within the tubular portion 102 of the plug 100, said opening being provided with a valve-seat adapted to be engaged by the ball check valve 116 so that said ball check-valve 116 will prevent a fluid flow from inner chamber 109 to the chamber 115, but a reverse flow from chamber 115 to inner chamber 109 will be permitted by the movement of said ball-valve 116 from its seat. Another channel 117, similar to the passage 114, leads from the inner chamber 110 to the annular space 99. In this channel there is provided a seat adapted to be engaged by the ball check-valve 118, said ball check-valve permitting fluid to flow from the annular chamber 99 through the channel 117 into the inner chamber 110, but preventing a reverse flow. A passage 119, similar to passage 112, connects the chamber 115 with the inner chamber 110, this passage 119 having one end of an angularly bent wire 120 extending thereinto to provide a fluid flow restricting orifice therein.

A reciprocative piston 121 is slidably supported within the tubular extension 102 of the plug 100. The one end of this piston is solid while the opposite end is recessed as at 122. This recess 122 of the piston 121 has a smaller recess 123 leading therefrom. An annular groove 124 is provided in the outer surface of the piston 121 and forms an annular space within the tubular portion 102. This annular space is in communication with the recess 123 of the piston through cross passages 125, thus it may be seen that the recessed end 122 of the piston 121 is in communication with duct 65 through the recess 123, cross passages 125, annular space provided by the groove 124, cross passages 125 in the tubular portion 102 of the plug 100 and the annular space provided by the groove 104 in said tubular portion 102.

The solid end of piston 121 has a lug 200 extending therefrom which is adapted to engage the bottom of the tubular part 102 of the screw plug 100 when the piston is in normal position whereby a space 115 is always provided between said piston and the bottom of tubular part 102.

At the point of communication between the smaller diameter recess 123 and the recess 122 in the piston 121 a valve-seat is provided which is engaged by the valve 130. This valve 130 has a stem portion 131 telescopically received by the tubular body portion 132 of the valve 133 which is adapted to engage the seat 70. Both these valves are yieldably urged into engagement with their respective seats by a single spring member 135. Adjacent the end of the recessed portion 122 of the piston transverse openings 136 are provided.

It will be noted that the seat 70 for the valve 133 is provided within the casing, said seat being immovable, however, the seat for the valve 130 is provided by the reciprocative piston 121, this seat being formed by the shoulder presented between the two recessed portions 122 and 123 in said piston. Thus the seat for valve 130 is movable longitudinally of the axis of the valves 133 and 130. In the Figs. 2 and 4 the piston 121 is shown in its uppermost extreme position, being moved thereby by fluid pressure, as will be described hereinafter. Normally lug 200 of this piston rests upon the inner surface of the tubular part 102 of plug 100, said lug, as has been mentioned, spacing the piston from said plug so as to form a chamber within the tubular portion 102 of the screw plug, which chamber is always in communication with the passages 119 and 114 so that the former may discharge into said chamber 115 and the latter may only permit discharge of fluid therefrom. As the piston is moved upwardly into the position shown in Figs. 2 and 4, the fluid chamber 115 is naturally enlarged as shown in Figs. 2 and 4.

The device functions in the following manner:

In response to the striking by the road wheels of an obstruction in the roadway, the axle 21 will be thrown upwardly toward the frame 20, thereby compressing the vehicle springs 22. As has been mentioned heretofore, this action of the axle causes clockwise rotation of the rocker shaft 51 resulting in a movement of the piston 35 toward the left as regards Figs 1, 2 and 3, the piston thus exerting a pressure upon the fluid within the spring compression control chamber 38. Due to this pressure the fluid is forced from said chamber 38 into the duct 65, being directed against the valves 130 and 87. The valve 87 cannot move in response to this fluid pressure, however, due to a minimum pressure by spring 135 upon the valve 130 it may move to establish a fluid flow from duct 65 through passages 105 and 125 into the recess 123, thence past the valve into the recess 122 of the reciprocative piston, thence through passage 66, the fluid pressure moving valve 81 from its seat to establish a flow into the chamber 62 from whence the fluid may flow through duct 69 into the spring rebound control chamber 39.

In response to the fluid pressure within the spring compression control chamber 38, fluid will also flow from the chamber 63 through the collar 89, passing through screen 91 into the chamber 92 in screw plug 86, thence through the passage 93 into the annular space 99, thence through the passage 117, around the ball check valve 118 directly into the chamber 110 in the plug 100. From here the fluid will flow through the orifice presented in the channel 119 by the cooperation of the metering wire 120 extending thereinto, the fluid discharging then into the chamber 115 normally provided between the piston 121 and the bottom of tubular part 102. Unless the fluid pressure is sufficient, piston 121 will not be moved. However, if the pressure of the fluid flow just described is sufficient, then, during this compression movement of the vehicle springs, the piston 121 will be moved upwardly toward the valve 133 and consequently valve 130, whose stem 131 telescopically engages the tubular body portion 132 of the valve 133, will be moved toward said valve 133, thereby compressing the spring 135 and consequently causing said spring to urge both valves 130 and 133 upon their seats with a greater pressure. This of course necessitates a greater fluid pressure to move either of the valves from their seats to establish fluid flows. It will be understood that the fluid flow or fluid circulation established in response to the movement of the piston to exert pressure upon the fluid within the spring compression control chamber is substantially the only flow that is directed into the chamber 115 to move the piston 121 upwardly.

As soon as the springs 22 have reached the limit of their compression, caused by the particular obstruction being met, they will return toward their normal load position with a rebounding movement, resulting in a reverse movement of the piston or particularly toward the right as regards Figs. 1, 2 and 3. Now pressure is being exerted upon the fluid within the spring rebound control chamber 39. Ordinarily this flow is established through the following circuit: From the chamber 39 through duct 69 into the chamber 62, thence through the duct or passage 68 against the valve 133, moving the valve to establish a flow into the valve chamber 60, thence through passage 67, moving the valve 87 from its seat to establish the flow into the chamber 63, thence through the duct 65 and its passage through the elements in the valve chamber 60 into the spring compression control chamber 38. If the spring compression movement has been slight and the piston 121 has not been moved upwardly on the compression control stroke of the shock absorber, then valve 133 is urged upon its seat with a substantially light pressure requiring a comparatively light pressure of fluid through the passage 68 to move said valve from its seat to establish the flow to the spring compression control chamber. However, if the piston 121 has been moved upwardly, as has been described, by increased pressure due to extended or increased accelerations of the spring action, then the valve 133 will be urged upon its seat and at increased pressure by spring 135, thus offering a greater restriction to the flow of fluid from duct 68 into the recess or valve chamber 60, thereby causing the shock absorber to provide a greater resistance to the return movement of the springs 27 to their normal load position.

After the fluid discharge into the chamber 115 has taken place as has been described and thus has moved the piston 121 toward its upper position, in which it increases the tension of the spring 135 between the valves 133 and 130, the flow of this fluid from said chamber 115 is restricted so as to retard the return movement of the piston 121 to normal position, consequently the increased tension of spring 135 is gradually decreased during the rebound movement of the vehicle springs, or more specifically while the shock absorber piston 35 is moved toward the right as regards Figs. 1, 2 and 3. It will be noted that the fluid within the valve chamber 115 may exit through the passage 114 past the valve 116 into the chamber 109, the discharge from said chamber 109 through the passage 112 being restricted by the metering wire 113 extending into said passage 112 and providing a fluid flow restricting orifice therein. From the passage 112 the fluid enters the annular space 99 and from there flows through the passage or duct 93 into the chamber 92, then through the screen 91, collar 89, into the chamber 63 where it joins the main flow of fluid from the rebound control chamber 39 to the compression control chamber 38.

From the aforegoing it may be seen that as long as the shock absorber movements are slight, not sufficient fluid pressure is built up within the fluid chamber 115 to move the piston 121 to increase the tension of the spring 135, which spring urges the fluid flow control valves 130 and 133 upon their respective seats. However, when the fluid pressure reaches a predetermined value and a sufficient flow at a proper velocity is established through passage 119 into the chamber 115, then the piston 121 will be moved from its normal position toward the valve 133, moving the valve 130 toward the aforementioned valve 133 to compress the comon control spring 133 which loads both valves, as has been mentioned.

The discharge of fluid from chamber 115 beneath the piston 121 is restricted to a greater degree than the flow of fluid into said chamber and therefore a fluid pressure is built up behind said piston 121 which fluid pressure, if the shock absorber actions are sufficiently numerous and of proper acceleration, may be maintained in chamber 115 substantially to hold the piston 121 in its spring compressing position. Under these conditions piston 121 will load both pressure release valves and thus greater pressures from both the spring rebound control chamber and the spring compression control chamber will be required to move said valves for establishing pressure relieving flows.

In the present invention applicant has provided an hydraulic shock absorber which is adapted to control both the approaching and separating movements of a vehicle frame and axle, said shock absorber having fluid flow restricting means which are automatically adjusted by a hydraulically operated member in response to only one movement of the shock absorber whereby the movements of the shock absorber will be resisted increasedly.

Applicant's control mechanism comprises an inherent part of the shock absorber, that is, the power developed by the shock absorber in one stroke is utilized to set into motion adjusting mechanism which adjusts the shock absorber increasedly to resist relative movements of the vehicle frame and axles.

While the form of embodiment of the present invention as herein disclosed, constitutes a preferred form, it is to be understood that other forms might be adopted, all coming within the scope of the claims which follow.

What is claimed is as follows:

1. An hydraulic shock absorber comprising, in combination, means adapted to circulate fluid in two directions within said shock absorber; means adapted to control said fluid circulation, and means adapted to adjust the said control means decreasingly to restrict the circulation in one direction in response to the pressure of the fluid circulation in the other direction.

2. An hydraulic shock absorber comprising, in combination, means adapted to circulate fluid in two directions within said shock absorber; fluid flow control means; and means adapted to be operated by the pressure of the fluid circulating in one direction for setting the fluid flow control means initially to provide a maximum restriction to the fluid circulation in the other direction and gradually decreasing said restriction.

3. An hydraulic shock absorber comprising, in combination, means adapted to circulate fluid in two directions within said shock absorber; separate means for controlling the fluid circulation in each direction; and means adapted to adjust the one fluid circulation regulating means in response to the circulation of fluid in the other direction initially to provide a maximum restriction and gradually reducing said restriction.

4. An hydraulic shock absorber comprising, in combination, means adapted to circulate fluid in two directions within said shock absorber; separate means for controlling the fluid circulation in each direction; and means adapted to be operated by the fluid circulation in one direction for adjusting the means for controlling the fluid circulation in the other direction to increase its restriction to said fluid circulation.

5. An hydraulic shock absorber adapted to resist the approaching and separating movements of two relatively movable members by the restriction of fluid circulation, fluid flow restricting means; actuator means adapted to be operated by the flow of fluid in response to and accordance with the approaching movement of said relatively movable members for adjusting said fluid flow restricting means gradually to increase its restriction of the fluid flow during said approaching movement of said members; and means adapted to retard the return movement of said actuator means during the separating movement of said members, gradually to diminish the restriction to fluid flow.

6. An hydraulic shock absorber adapted to resist the approaching and separating movements of two relatively movable members by the restriction of fluid circulation, a plurality of spring-loaded fluid flow restricting devices; and means providing a seat for one of said devices and adapted to be actuated by the pressure of the fluid in response to the approaching movement of said relatively movable members for adjusting one of said fluid flow restricting devices relatively to the other gradually to increase the restriction of said other devices to said flow of fluid and to provide for substantially maximum restriction to fluid flow by the adjusted device at the beginning of the separating movement of said members.

7. An hydraulic shock absorber adapted to resist the approaching and separating movements of two relativeley movable members by the restriction of fluid circulation, spring loaded valves for restricting said fluid circulation; and hydraulically operated means adapted to be actuated by the circulation of fluid in response to one movement of said relatively movable members to increase the spring load on said valves.

8. An hydraulic shock absorber adapted to resist the approaching and separating movements of two relatively movable members by the restriction of fluid circulation, spring loaded valves for restricting said fluid circulation; and hydraulically operated means adapted to be actuated by the circulation of fluid in response to the approaching movement of said relatively movable members to increase the spring load on said valves preparatory to the circulation of fluid responsive to the separating movement of said members.

9. An hydraulic shock absorber adapted by the restriction of fluid circulation in one direction or the other, respectively to resist the approaching or separating movements of two relatively movable members; two valves, normally closed, adapted to restrict said fluid circulation; a spring yieldably urging said valves into circuit closing position; and hydraulically operated means adapted to increase the tension of the spring only during one of the movements of said relatively movable members.

10. An hydraulic shock absorber adapted by the restriction of fluid circulation in one direction or the other, respectively to resist the approaching or separating movements of two relatively movable members; two valves, normally closed, adapted to restrict said fluid circulation; a spring yieldably urging said valves into circuit closing position; hydraulically operated means adapted to be moved out of normal position to increase the tension of the spring in accordance with the speed and magnitude of the approaching movement of said relatively movable members, and means for retarding the return of said hydraulically operated means to normal position during the separating movement of said members.

11. A hydraulic shock absorber adapted to resist the approaching and separating movements of two relatively movable members by the restriction to fluid circulation in one or the other direction respectively, comprising, two oppositely acting pressure release valves; a single spring yieldably urging said valves into normally closed positions; and a hydraulically operated member, providing a valve-seat for one of the valves, and adapted to be actuated by the fluid circulation in one direction to move one of said valves to increase the tension of the spring engaging it.

12. An hydraulic shock absorber adapted to resist the approaching and separating movements of two relatively movable members by the restriction to fluid circulation in one or the other direction respectively, comprising, two oppositely acting pressure release valves; a single spring interposed between said valves, yieldably urging them into fluid flow shutting off positions; a piston member providing a seat for one of the valves and adapted to be actuated to compress the spring in response to and accordance with the fluid circulation set up in the shock absorber by the approaching movement of the relatively movable members; and means for retarding the return movement of the piston during the separating movement of said members.

13. A hydraulic shock absorber adapted to resist the approaching and separating movements of two relatively movable members comprising a casing having a cylinder in which a reciprocative piston forms two compression chambers; a valve chamber in the casing; ducts leading from the respective compression chambers into said valve chamber; oppositely acting pressure release valves in said valve chamber; a reciprocative member in said valve chamber adapted, in response to the flow of fluid into said valve chamber in one direction to adjust the pressure release valves; and means for retarding the return of the valve adjustment to normal during the flow of fluid into the valve chamber in the other direction.

14. A shock absorber comprising, a casing providing a cylinder in which a reciprocative piston forms two fluid compression chambers; a valve chamber in said casing; two oppositely acting valves in said chamber; ducts leading from the respective compression chambers into said valve chamber, said ducts being normally closed by said valves; a spring interposed between said valves yieldably urging them into duct closing position; a reciprocative piston in said valve chamber engaging one of the valves and forming a fluid chamber at one end of the valve chamber; means providing communication between said fluid chamber and one of the ducts; and a restricted outlet for said fluid chamber.

15. An hydraulic shock absorber comprising, means for circulating fluid in two directions through said shock absorber; oppositely acting means for restricting said fluid circulation; reciprocative means for adjusting said restricting means to vary its restriction to the flow of fluid; means providing for the transfer of fluid pressure in one direction against said reciprocative means; and means for retarding the return movement of said reciprocative means.

16. An hydraulic shock absorber comprising a fluid containing cylinder; two pistons in said casing, one forming two compression chambers between which fluid is circulated in either direction in response to pressure exerted upon the fluid by said piston, the other piston being movable by the fluid pressure in one of said compression chambers; fluid flow control devices for restricting fluid circulation between the compression chambers in either direction, one of said devices being engaged by the last mentioned piston and movable thereby to adjust the degree of the restriction by said devices of fluid flow in one direction between said compression chambers.

17. An hydraulic shock absorber comprising, means for circulating fluid in two directions, adjustable means for controlling said fluid circulation; and means adapted to be actuated by the pressure of the fluid flow in one direction for adjusting the fluid flow controlling means to vary its regulation of the flow of fluid in both directions.

18. An hydraulic shock absorber comprising, a casing providing a cylinder in which a reciprocative piston forms two compression chambers; a valve-chamber in said casing; ducts connecting the respective compression chambers with said valve chamber; a plug having a tubular portion extending into said valve-chamber said portion having side openings providing communication between the ducts and the interior of said portion; two oppositely acting, spring loaded, pressure release valves in said valve chamber; a piston reciprocative in the tubular portion of the plug forming a fluid chamber therein, and providing a valve-seat for one of the valves; means connecting one of the ducts with said fluid chamber; and valves in said means, one of which is adapted to establish a metered flow of fluid from said duct into said fluid chamber as the shock absorber piston moves in one direction, the other being adapted to establish a restricted flow of fluid from said fluid chamber back to the duct as the shock absorber piston moves in the other direction.

19. An hydraulic shock absorber comprising a fluid containing casing; means for circulating fluid back and forth within said casing; two control devices for restricting said fluid circulation; adjusting means engaging one of said devices and adapted to be operated by fluid flow in one direction for adjusting one control device relatively to the other to increase the restriction to the flow of fluid by both devices; and means for regulating the fluid flow to and from the adjusting means so that the flow to said means is less restricted than the flow from said means.

20. An hydraulic shock absorber comprising a fluid containing casing; means for circulating fluid back and forth within said casing; spring loaded valves adapted to restrict said fluid circulation; and means engaging one of said valves and adapted, in response to the fluid circulation in one direction, to increase the spring load on said valves.

21. An hydraulic shock absorber comprising a fluid containing casing; means for circulating fluid back and forth within said casing; oppositely acting, spring loaded valves adapted to restrict said fluid circulation in one direction or the other respectively, a shiftable valve-seat member for one of said valves; means for directing the fluid flow in one direction against said valve-seat member to move it to increase the spring load on said valves; and means providing for the gradual return of said valve-seat for decreasing said spring load while the fluid is being circulated in the oposite direction.

EDWIN F. ROSSMAN.